UNITED STATES PATENT OFFICE

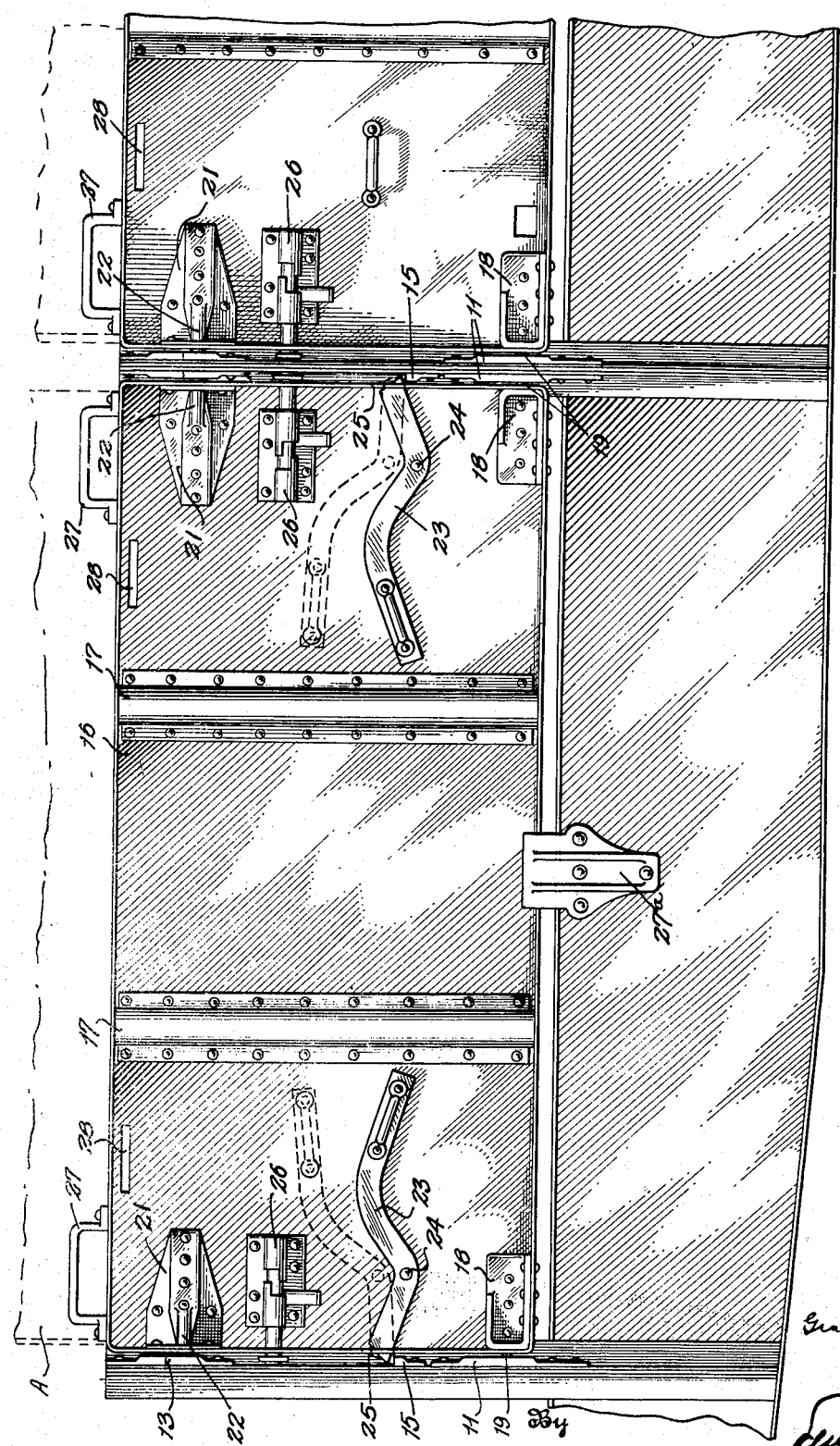

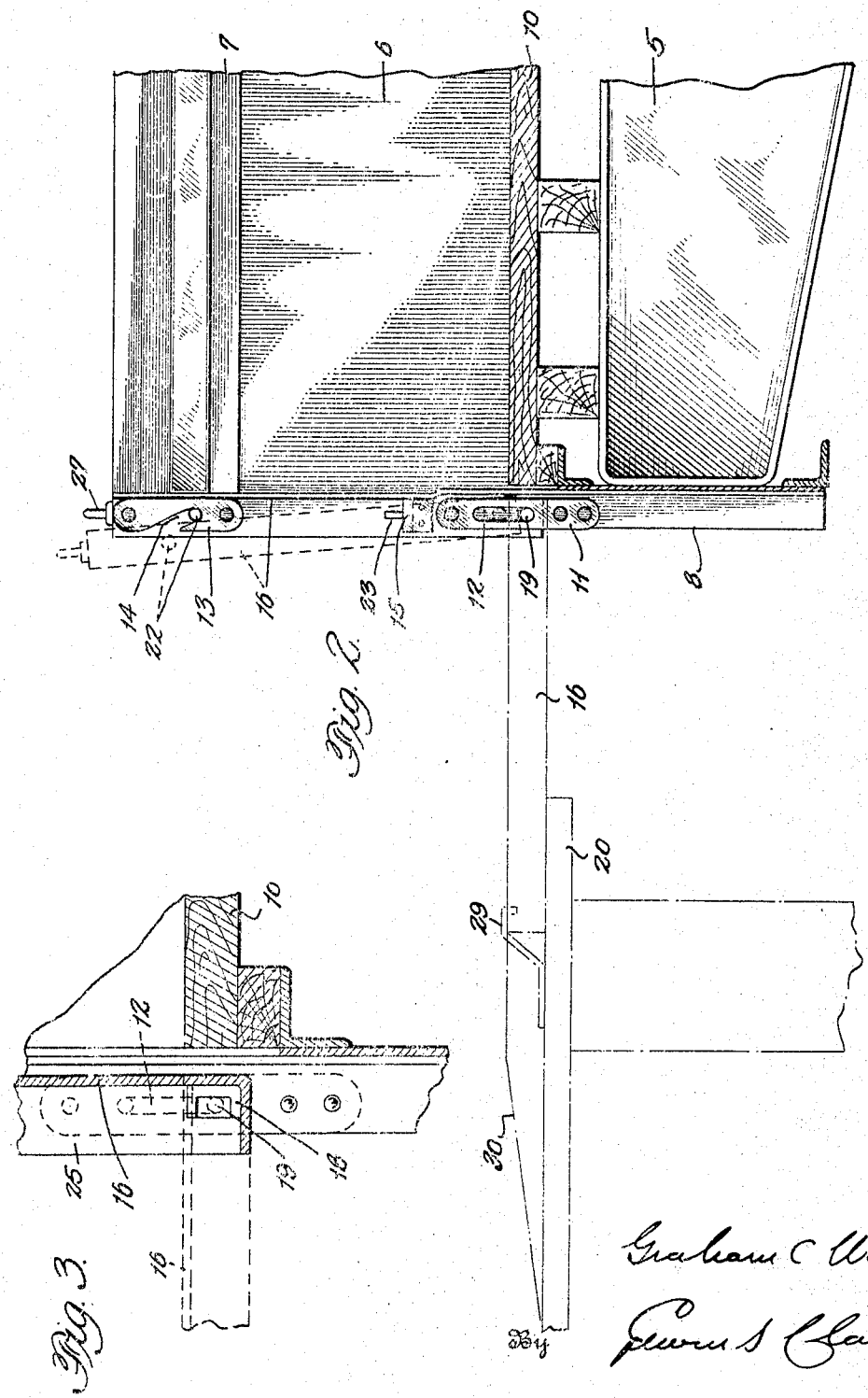

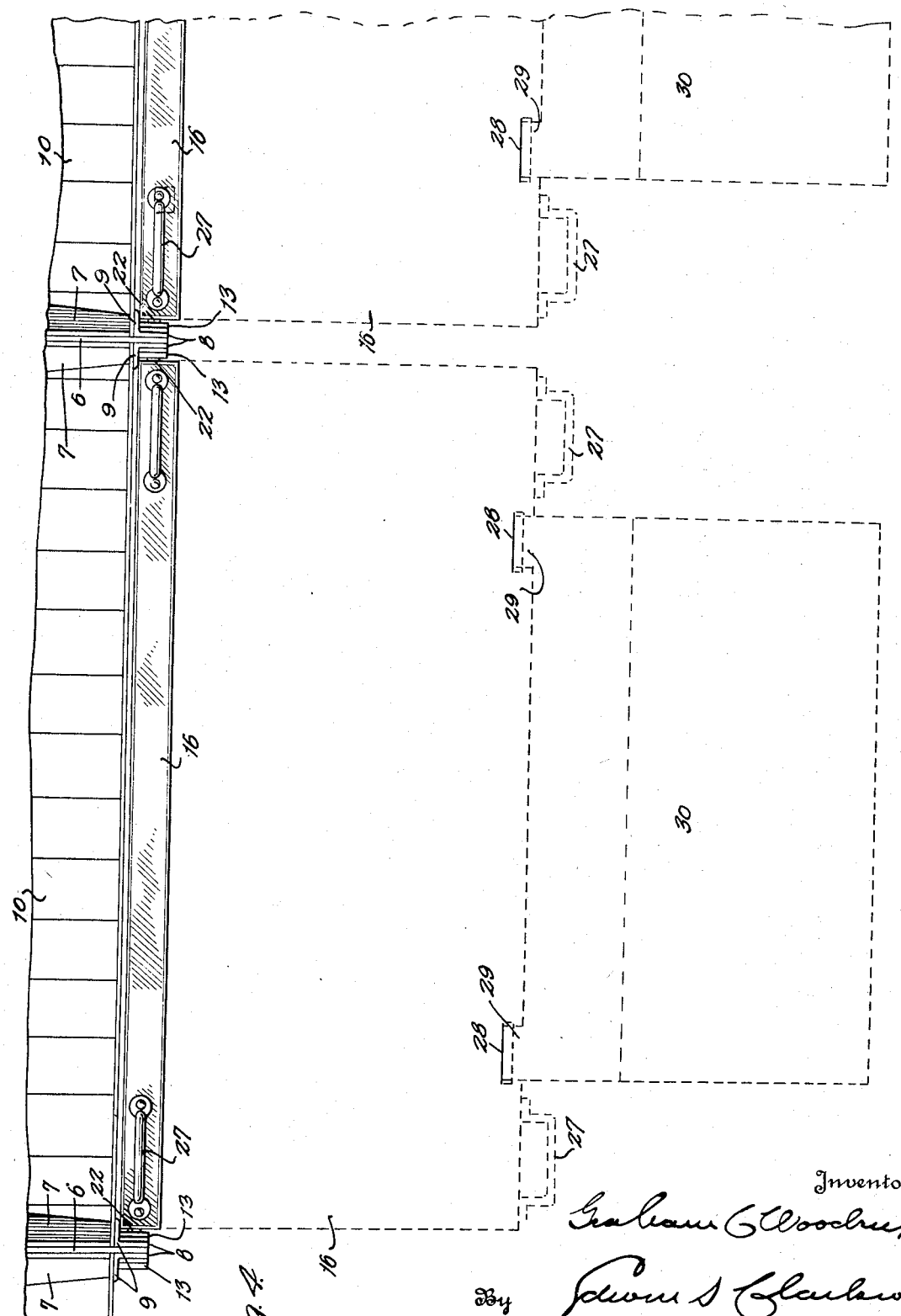

GRAHAM C. WOODRUFF, OF BRONXVILLE, NEW YORK, ASSIGNOR TO THE L. C. L. CORPORATION, A CORPORATION OF DELAWARE

DROP-SIDE CAR

Application filed April 12, 1929. Serial No. 354,637.

My invention relates to container cars broadly of the type shown in Reissue Patent No. 16,073 of May 19, 1925.

The object of my invention is to provide a container car to handle interchangeable containers of the general type shown in the said reissue patent, but other types of interchangeable containers may be handled without departing from the spirit of my invention.

One of the great problems of railroads is that of human labor in the many handlings of freight as practiced prior to the commercial introduction of the container car. By the use of the container car costs of handling freight have been materially reduced, to say nothing of the practical elimination of theft, or pilfering which was so common prior to the introduction of container cars, and resulted in a very considerable loss internationally to the railroads.

In some of the types of container cars now in use it is necessary to employ a crane at each loading and unloading point to move the containers from and onto a car. Therefore, many small stations, not equipped with cranes have been deprived of this economical and highly efficient container service.

One of the objects of my invention is to provide a car of such type that containers may be moved from and on to the car without the necessity of using a crane, and at the same time maintain the contents of the containers against pilfering. One of the important advantages of a car of this type is that a container containing merchandise may be unloaded at a station at any hour of the day or night and left there in perfect security and the empty container at such station may be loaded on a car to take the place of the loaded container that was removed.

According to the preferred practice of my invention I provide the car with cross bulkheads that divide the car into compartments, each compartment having a guide for the container, and it is moved into the compartment, and each compartment provided with a door at each end, and its securing mechanism being such that it is impossible for the door to swing to an open position while the car is en route, or at a station, even though the operator should fail to close the usual locking means. This is an important safety feature as there is no danger of a door swinging outwardly while en route and side wiping a car on an adjacent track; with these and other objects in view my invention consists of the parts, and combination of parts as will be hereinafter more fully set forth.

In the drawings:

Figure 1 is a side elevation of a portion of a car embodying my invention.

Figure 2 is a vertical transverse detailed section through the doorway of the car.

Figure 3 is another detail section, showing features of construction.

Figure 4 is a top plan view of the side wall of a car and a portion of the floor of the car showing in dotted lines the doors in open position to function as runways for trucks.

The reference numeral 5 designates a car of any approved type divided into compartments by means of the transversely disposed bulkheads 6. Secured to these bulkheads are container guides 7, the outer edges of which are preferably of a curve so as to readily guide the container A into position on the car.

At each end of the bulkheads I secure a post which is made up of the angle bars 8 suitably secured to the bulkhead, one of the arms of each angle bar functioning as a door stop as at 9.

I secure to the angle bars 8 about in the zone of the floor 10 of the car a trunnion bearing plate 11 having a vertically disposed trunnion bearing 12, and at the top of the posts I secure a keeper 13 having an elongated bearing slot 14 opening through the side of the keeper plate 13, as clearly shown in Figure 2. I also secure to the posts a fulcrum bearing 15 of any approved type.

The side wall of the car comprises a plurality of independently movable sections, or doors 16 which are provided with suitable reinforcing members 17 to assist in sustaining the load of a container over the door when it functions as a gangplank between the car and the station platform, as will be hereinafter referred to.

Each of these doors is provided with a trunnion plate 18 firmly secured at each lower corner of the door from which extends a trunnion 19 adapted to enter a vertical slide in the elongated trunnion bearing 12 of the trunnion plate 11. It will be seen from Figure 2 that these doors are adapted to swing downward and function as a gangway between the car and the station platform 20.

Near the upper corners of each door I secure suitable plates 21 from each of which extends a latch or bolt 22, which latches 22 are adapted to enter the keeper bearing 14 when in the position shown in dotted lines in Figure 2 and to be interlocked with the keeper bearing 14, as shown in full lines in Figure 2.

I have provided each door with a lever 23 pivoted at 24 with the short arm of each adapted to pass through a suitable opening in the side flange 25 of the door, as clearly shown in Figure 1 and engage the fulcrum 15. While I have shown this lever as adapted for the purpose for which it is intended it is, of course, understood that I may employ various means to perform the function of the lever in lifting the door.

The doors may be provided with any kind of locks 26 of the general type, such as illustrated in the drawings, but, of course, it is understood that any form of lock may be employed for this purpose without departing from the spirit of my invention. Secured to the car 5 is a combined support and stop 27 intermediate the side edges of the doorway. The doors are provided with openings 28 into which hooks 29 of the runway 30 may be engaged to hold the runway securely up against the upper edge of the door 16 when the door is in position shown in Figure 2.

The normal position of the doors 16 is that shown in Figure 1 and in full lines in Figure 2 in which position it is firmly held against outward movement by the interengagement of the trunnions 19 with their bearing and the latch 22 with its bearing, the stop 27 assisting in supporting the door at the center against any thrust against the inside of the door.

When it is desired to open these doors 16 the lever 23, or some other suitable means, is engaged with the fulcrum 15 and moved to the dotted line position thereby vertically moving the door and trunnions 19 in their bearings and the latch 22 in its keeper to the dotted position shown in Figure 2 whereupon the trunnions 19 are adapted to move to the dotted line position shown in Figure 2, and the door may be swung outwardly on its trunnions 19 to the horizontal position shown in Figure 2 and function as a gangway between the car and the station platform 20. Containers loaded and empty may be moved by a lift truck, or otherwise, from and to the car through the doorways between the cross bulkheads without the aid of a crane.

When it is desired to close the door it must be swung to a partially closed position as indicated in dotted lines in Figure 2 which positions the latch 22 opposite the opening to the keeper bearing 14 whereupon the top of the door is swung inward against the door stops 9 and the door is permitted to then drop by gravity until the trunnion 19 is at the bottom of its bearing and the keeper 22 is at the bottom of its bearing, as shown in full lines in Figure 2. 27' are hand holds to assist in the manipulation of the doors.

When the doors are in the lowered position shown in dotted lines in Figure 2 the stop 27a functions to support the door intermediate its trunnions to assist in sustaining the load of a container passing across the door to and from the car.

I am aware that changes may be made in the details of construction without departing from the spirit of my invention and from the scope of the appended claims.

What I claim is:

1. The combination with a freight car, of a side wall comprising a plurality of independent movable sections, locking means for said sections, and means holding the sections in closed position independent of the locking means.

2. The combination with a freight car, a side wall comprising a plurality of movable sections, standards interposed between the sides of two adjacent sections, a keeper on each side of the standards near the top thereof, a latch on each side of the section, said latch adapted to move into said keeper when the section is raised above its normal closed position and slide into the keeper when the door is moved to its normal closed position.

3. The combination with a freight car, of a side wall comprising a plurality of independently movable sections, standards between the sides of the said sections, elongated trunnion bearings on said standards, trunnions on and near the bottoms of the sections cooperatively engaging said bearings and adapted to rotate and slide vertically in said bearings, keepers secured to and near the top of the standards and latches on the section adapted to enter said keepers when the section is raised above its normal closed position and move into interlocking engagement with the keepers when the section is lowered to its normal closed position.

4. The combination with a freight car, of a side wall comprising a plurality of independently movable sections, standards between the sections, an elongated trunnion bearing secured to and near the bottom of the standards, a keeper secured to and near the top of the standards and having an enlongated bearing therein, trunnions secured to the sections adapted to revolve and move vertically in said trunnion bearing, and latches secured to the door adapted to enter the said keepers when the section is raised above its normal closed position, and be locked in the keepers when the section is moved to its normal closed position.

5. The combination with a freight car, of a side wall comprising a plurality of independently movable sections, standards between the sections, an elongated trunnion bearing secured to and near the bottom of the standards, a keeper secured to and near the top of the standards and having an elongated bearing therein, trunnions secured to the sections adapted to revolve and move vertically in said trunnion bearing, and latches secured to the door adapted to enter the said keepers when the section is raised above its normal closed position, and be locked in the keepers when the section is moved to its normal closed position, and means to raise the section bodily above its normal closed position.

6. The combination with a freight car, of bulkheads transversely disposed on the car in spaced relation to divide the car into compartments, a post secured to the outer ends of the bulkheads, elongated trunnion bearings secured to said posts near the bottom thereof, elongated keepers secured to said posts near the top thereof, a door for each end of each compartment, trunnions secured to the door adapted to revolve and vertically slide in said trunnion bearings, a latch on the door near the top thereof adapted to enter the keeper only when the door is raised above its normal closed position, and adapted to be interlocked in said keeper when the door is lowered to its normal closed position.

7. The combination with a freight car, of bulkheads transversely disposed on the car in spaced relation to divide the car into compartments, a post secured to the outer ends of the bulkheads, elongated trunnion bearings secured to said posts near the bottom thereof, elongated keepers secured to said posts near the top thereof, a door for each end of each compartment, trunnions secured to the door adapted to revolve and vertically slide in said trunnion bearings, a latch on the door near the top thereof adapted to enter the keeper only when the door is raised above its normal closed position, and adapted to be interlocked in said keeper when the door is lowered to its normal closed position, and means to bodily elevate the door.

8. The combination with a freight car, of bulkheads transversely disposed on the car in spaced relation to divide the car into compartments, a post secured to the outer ends of the bulkheads, elongated trunnion bearings secured to said posts near the bottom thereof, elongated keepers secured to said posts near the top thereof, a door for each end of each compartment, trunnions secured to the door adapted to revolve and vertically slide in said trunnion bearings, a latch on the door near the top thereof adapted to enter the keeper only when the door is raised above its normal closed position, and adapted to be interlocked in said keeper when the door is lowered to its normal closed position.

9. The combination with a freight car, posts secured at intervals along the sides of the car, elongated trunnion bearings secured to said posts in the bottom thereof, keepers having elongated bearings and secured near the top of the posts, a door secured between each pair of posts, trunnions secured to the door and adapted to revolve and vertically slide in said elongated trunnion bearings, latches on the door near the top thereof adapted to enter the elongated bearing of the keeper only when the door is raised above its normally closed position and adapted to move on and be interlocked with the bearing of the keeper when the door is lowered to its normally closed position, a fulcrum secured to said posts, a lever pivoted to the door and adapted to engage said fulcrum to move the door to locked and unlocked position.

In testimony whereof I affix my signature.

GRAHAM C. WOODRUFF.